(12) United States Patent
Vick et al.

(10) Patent No.: US 8,764,360 B2
(45) Date of Patent: Jul. 1, 2014

(54) STRAP CONNECTOR

(71) Applicant: Southern Bracing Systems Enterprises, LLC, Armuchee, GA (US)

(72) Inventors: Wayne E. Vick, Armuchee, GA (US); David W. Vick, Armuchee, GA (US); Clayton D. Vick, Rome, GA (US); Joseph David Hawks, Powder Springs, GA (US); Eddie R. Shockley, Kingston, GA (US); John Forcier, Rome, GA (US)

(73) Assignee: Southern Bracing Systems Enterprises, LLC, Armuchee, GA (US)

( * ) Notice: Subject to any disclaimer, the term of this patent is extended or adjusted under 35 U.S.C. 154(b) by 0 days.

(21) Appl. No.: 13/680,615

(22) Filed: Nov. 19, 2012

(65) Prior Publication Data

US 2014/0140784 A1    May 22, 2014

(51) Int. Cl.
  *A44B 11/04*  (2006.01)
(52) U.S. Cl.
  USPC .............................................. 410/97; 24/198
(58) Field of Classification Search
  CPC ......... A44B 11/00; A44B 11/02; A44B 11/04
  USPC ................................ 410/97; D8/356; 24/198
  See application file for complete search history.

(56) References Cited

U.S. PATENT DOCUMENTS

| 77,918 | A | 5/1868 | Roland |
|---|---|---|---|
| 278,097 | A | 5/1883 | Collins |
| 761,038 | A | 5/1904 | Edgerton |
| 873,445 | A | 12/1907 | Maltby |
| 2,224,773 | A | 12/1940 | Shaulson |
| 2,260,060 | A | 10/1941 | Shaulson |
| 2,269,696 | A | 1/1942 | Shaulson |
| 3,173,539 | A | 3/1965 | Looker |
| 3,478,394 | A | 11/1969 | Davis |
| 4,470,176 | A | 9/1984 | Vermeulen et al. |
| D284,299 | S | 6/1986 | Auerbach et al. |
| 5,242,237 | A | 9/1993 | Wagner |
| D347,989 | S | 6/1994 | DeWard |
| 5,632,068 | A | 5/1997 | Riley et al. |
| D389,286 | S | 1/1998 | Celestina-Krevh et al. |
| 5,733,004 | A | 3/1998 | Celestina-Krevh et al. |

(Continued)

OTHER PUBLICATIONS

Design U.S. Appl. No. 29/437,586, Notice of Allowance mailed Apr. 2, 2013 (9 pages).

(Continued)

*Primary Examiner* — Hilary Gutman
(74) *Attorney, Agent, or Firm* — Kilpatrick Townsend & Stockton LLP (57) ABSTRACT

Described are connectors comprising: a body; at least four arms extending from the body; a first pair of opposing, substantially closed slots along a first axis of the body, wherein each slot is defined by one or more of the at least four arms and an edge of the body; and a second pair of opposing, substantially closed slots along a second axis of the body, wherein each slot is defined by one or more of the at least four arms and an edge of the body; wherein, each slot comprises an opening defined by at least two of the at least four arms; and wherein, the openings of the first pair of opposing, substantially closed slots are offset and the openings of the second pair of opposing, substantially closed slots are offset. Methods of coupling straps together via such connectors, and the resulting net-like structure, are also described.

17 Claims, 5 Drawing Sheets

(56) References Cited

U.S. PATENT DOCUMENTS

| | | |
|---|---|---|
| 5,772,371 A | 6/1998 | Ackerman |
| 7,143,708 B1 | 12/2006 | Cimino |
| D567,769 S | 4/2008 | Sinai |
| D584,596 S | 1/2009 | Doverspike |
| D591,200 S | 4/2009 | Freeman |
| 7,549,262 B2 | 6/2009 | Roessett et al. |
| D619,097 S | 7/2010 | McCarthy |
| D640,530 S | 6/2011 | Perez |
| D646,151 S | 10/2011 | Potts et al. |
| D651,503 S | 1/2012 | Ellis |
| 8,127,407 B2 | 3/2012 | Wong et al. |
| D667,719 S | 9/2012 | Wong |
| D676,310 S | 2/2013 | Lowrance |
| D686,059 S | 7/2013 | Paik et al. |
| D686,906 S | 7/2013 | Vick et al. |
| D688,977 S | 9/2013 | Mohr |
| D691,581 S | 10/2013 | Mercs et al. |
| D691,875 S | 10/2013 | Ganski |
| D691,878 S | 10/2013 | Ganski |
| D692,746 S | 11/2013 | Lawson et al. |
| 2007/0209165 A1 | 9/2007 | Sorensen et al. |

OTHER PUBLICATIONS

Design U.S. Appl. No. 29/460,607, filed Jul. 12, 2013 (5 pages).
U.S. Appl. No. 29/460,607, Notice of Allowance mailed Nov. 27, 2013, 11 pages.

STRAP CONNECTOR

FIELD OF THE INVENTION

The field of the invention relates to the securing and strapping of loads, cargo, and/or the like.

BACKGROUND

Known methods and apparatuses for securing loads or cargo to platforms or pallets commonly utilize either cargo nets or tensioned straps. Cargo nets generally confine the majority of the surface area of a load (thanks to the net-like structure of the mechanism), but typically cannot be tensioned, and if necessary, re-tensioned, so as to fully secure and immobilize the load, which may vary in shape and size. As a result, the load may shift prior to or during transport. Moreover, cargo nets are typically not capable of substantial internal adjustment (i.e., the cross-points of the net are sewn or tied together). As a result, different sized cargo nets may be required for various shaped or sized loads.

On the other hand, individual straps may be tensioned to fully secure and generally immobilize a load as the whole, but typically cannot generally confine a majority of the surface area of a load, which may vary in shape and size. As a result, free or hanging portions of the load not in direct contact with a tensioned strap may shift prior to or during transport. Thus, to eliminate any potential shifting of a load (or portions thereof), which may vary in shape and size, it may be desirable to provide a strap connector for use with straps to enable an adjustable net-like system of tensioned straps, akin to a cargo net.

SUMMARY

Certain embodiments of the present invention include a connector comprising: a body; at least four arms extending from the body; a first pair of opposing, substantially closed slots along a first axis of the body, wherein each slot is defined by one or more of the at least four arms and an edge of the body; and a second pair of opposing, substantially closed slots along a second axis of the body, wherein each slot is defined by one or more of the at least four arms and an edge of the body; wherein, each slot comprises an opening defined by at least two of the at least four arms; and wherein, the openings of the first pair of opposing, substantially closed slots are offset and the openings of the second pair of opposing, substantially closed slots are offset.

In some embodiments, the at least four arms are integrally formed with the body. In some embodiments, the slots within the each pair of opposing, substantially closed slots are substantially similar in shape and size. In embodiments, the slots within the each pair of opposing, substantially closed slots are parallel.

Certain embodiments of the present invention also include a method of coupling a first strap with a second strap via a connector, the method steps comprising: inserting a first portion of the first strap into a first slot of the connector via the opening of the first slot; inserting a second portion of the first strap into a second slot of the connector via the opening of the second slot, and across the body of the connector; inserting a first portion of the second strap into a third slot of the connector via the opening of the third slot; and inserting a second portion of the second strap into a fourth slot of the connector via the opening of the fourth slot, and across the body of the connector and a length of the first strap; wherein, the second slot is positioned across the body opposite the first slot and the fourth slot is positioned across the body opposite the third slot.

Certain embodiments of the present invention also include a net-like system of straps joined by one or more connectors comprising: a body; at least four arms extending from the body; a first pair of opposing, substantially closed slots along a first axis of the body, wherein each slot is defined by one or more of the at least four arms and an edge of the body; and a second pair of opposing, substantially closed slots along a second axis of the body, wherein each slot is defined by one or more of the at least four arms and an edge of the body; wherein, each slot comprises an offset opening defined by at least two of the at least four arms.

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

BRIEF DESCRIPTION OF THE DRAWINGS

Illustrative embodiments of the present invention are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention provide connectors and methods of using the connectors to secure loads, cargo, and the like. While the connectors are generally discussed for use with straps, they are by no means so limited. Rather, embodiments of the connectors may be used in connection with any strapping or securing mechanisms.

FIGS. 1-5 illustrate embodiments of a connector 100. In these embodiments, the connector 100 comprises a body 102, at least one arm 104 extending from the body 102, and two pairs of opposing slots 106. In some embodiments, the at least one arm 104 may comprise at least four arms 104. In some embodiments, the connector 100 may comprise three or more pairs of opposing slots 106. In some embodiments, one or more slots 106 may comprise an opening 108 for entry of a strap 200 into the slot 106.

The connector 100 couples two or more straps 200 together, as illustrated by example in FIGS. 2-5. In these embodiments, the connector 100 may be releasably coupled to the strap(s) 200 via the slots 106. The connector 100 may be formed of materials including but not limited to aluminum, steel, or other metallic materials known to withstand force. Throughout embodiments, the shape, size, and/or dimensions of the connector 100 may vary as needed, and may also vary depending on the strap(s) 200. For example, in some embodiments, such as the embodiments illustrated in FIGS. 1-5, the connector 100 may be generally rectangular. In other embodiments, the connector 100 may generally resemble a square, hexagon, octagon, or other similar shape.

The body 102 of the connector 100 provides the base for the at least one arm 104. The body 102 may be formed of materials including but not limited to aluminum, steel, or other metallic materials known to withstand force. Throughout embodiments, the shape, size, and/or dimensions of the body 102 may vary as needed, and may specifically vary depending on the strap(s) 200. For example, in some embodiments, such as the embodiments illustrated in FIGS. 1-5, the body 102 may be generally rectangular. In other embodiments, the connector 100 may generally resemble a circle, square, hexagon, octagon, or other similar shape. In some embodiments, the body 102 may be solid. In other embodiments, the body 102 may be hollow.

The at least one arm 104 extends from the body 102 to define one or more parameters of one or more slots 106, as illustrated by example in FIGS. 1-5. In these embodiments, the arm 104 serves as a boundary of the slot 106 and may grip the strap(s) 200 during coupling. In some embodiments, the arm 104 may also define the parameters of the opening 108, as illustrated by example in FIGS. 1-5. In some embodiments, two or more arms 104 may define the parameters of the slot 106 and/or opening 108. For example, in some embodiments, such as the embodiments illustrated in FIGS. 1-5, each slot 106 and each opening 108 is defined by a pair of arms 104. Throughout embodiments, the shape, size, and/or dimensions of the arm 104 may vary as needed, and may also vary depending on the strap(s) 200. For example, in some embodiments, such as the embodiments illustrated in FIGS. 1-5, the arms 104 may be L-shaped. In some embodiments, the shape, size, and/or dimensions of the arm 104 may vary upon the desired shape, size, and/or dimensions of the slot 106 and/or opening 108. The shape, size, and/or dimensions of each arm 104 may also vary within each embodiment. For example, in some embodiments, such as the embodiments illustrated in FIGS. 1-5, one arm 104 may be relatively short as compared to a different arm 104. In some embodiments, one arm 104 may comprises multiple arms 104.

For example, in the embodiments illustrated in FIGS. 1-5, arm 104a extends from the body 102 a desired distance in an L-shaped manner and terminates at end 110. Similarly, arm 104b extends from the body 102 a different desired distance in an L-shaped manner and terminates at end 112. In these embodiments, prior to terminating at ends 110 and 112, each arm 104 may have a straight inner edge portion 111 and 113 spaced in parallel with an edge 116 of the body 102. A person of skill in the art, however, will understand that the inner edge portions 111 and 113 may have any surface contour. The slot 106 is defined by the area between the straight edge portions 111 and 113 of the arms 104 and the edge 116 of the body 102. The ends 110 and 112 define the opening 108 to the slot 106. In the embodiments illustrated in FIGS. 1-5, all four slots 106 and four openings 108 are configured identically. In some embodiments, however, one or more slots 106 and/or openings 108 may be unique, or otherwise dissimilar from the other slots 106 and/or openings 108.

In some embodiments, such as the embodiments illustrated in FIGS. 1-5, the at least one arm 104 and the body 102 may be integrally formed. In other embodiments, the arm 104 may be coupled to the body 102 by a variety of mechanisms, including but not limited to adhesives, screws, bolts, fasteners and other similar mechanisms. In some embodiments, such as the embodiments illustrated in FIGS. 1-5, one or more arms 104 may be integrally formed with one or more other arms 104. The arms 104 may be formed of materials including but not limited to aluminum, steel, or other metallic materials known to withstand force.

The connector 100 comprises at least two pairs of opposing slots 106. The slots 106 are voids within the connector 100 that may capture portions of the strap 200 within the connector 100 during coupling, as illustrated by example in FIGS. 2-5. As illustrated in the embodiments of FIGS. 1-5, the opposing slots 106 within each pair of opposing slots 106 may be positioned on opposite sides of the body 102 from one another (e.g., opposing side 102a and opposing side 102c; opposing side 102b and opposing side 102d). In these embodiments, each pair of opposing slots 106 may correspond to an individual strap 200 to be coupled with the connector 100, as illustrated in FIGS. 2-5. In some embodiments, such as the embodiments of FIGS. 1-5, the two opposing slots 106 within a pair of opposing slots 106 may be aligned. In some embodiments, such as the embodiments of FIGS. 1-5, the two opposing slots 106 within the pair of opposing slots 106 may be parallel to one another. Throughout embodiments, the shape, size, and/or dimensions of the slots 106 may vary as needed, and may also vary depending on the strap(s) 200. For example, in some embodiments, such as the embodiments illustrated in FIGS. 1-5, the slots 106 may be rectangular, so as to correspond to the shape of the strap 200. In some embodiments, such as the embodiments of FIGS. 1-5, the two opposing slots 106 within a pair of opposing slots 106 may be similar in shape and size.

In some embodiments, the slot 106 may be completely closed. In other embodiments, such as the embodiments illustrated in FIGS. 1-5, the slot 106 may comprise the opening 108, but otherwise be substantially closed. In these embodiments, the opening 108 may allow for entry of a portion of the strap 200 within the slot 106. The opening 108 thereby allows for coupling of any portion of the strap 200 to the connector 100, rather than just an end of the strap 200 (not pictured). Throughout embodiments, the shape, size, and/or dimensions of the opening 108 may vary as needed, and may also vary depending on the strap(s) 200 and/or slots 106. Generally, the shape and size of the opening 108 should allow for intentional insertion of the strap 200 into the slot 106 via the opening 108, but also prevent unintentional removal of the strap 200 from the slot 106 via the opening 108. For example, in some embodiments, such as the embodiments illustrated in FIGS. 1-5, the opening 108 may have a width approximately ¼ of the width of the slots 106.

In some embodiments, the two opposing slots 106 within a pair of opposing slots 106 may both contain openings 108. In some embodiments, the two openings 108 may be aligned. In other embodiments, such as the embodiments illustrated in FIGS. 1-5, however, the openings 108 may be offset such that they do not overlap. In these embodiments, the arms 104 forming the offset openings 108 counterbalance the tensioning forces applied (directly or indirectly) to the connector 100 by the strap 200 during tensioning, and thereby enable an even tensioning of the strap 200. In these embodiments, the offset openings 108, and the even tensioning of the strap 200 achieved by the offset openings 108, may also prevent, or at least limit, any cutting or tearing of the strap 200 during tensioning.

Figure 1:
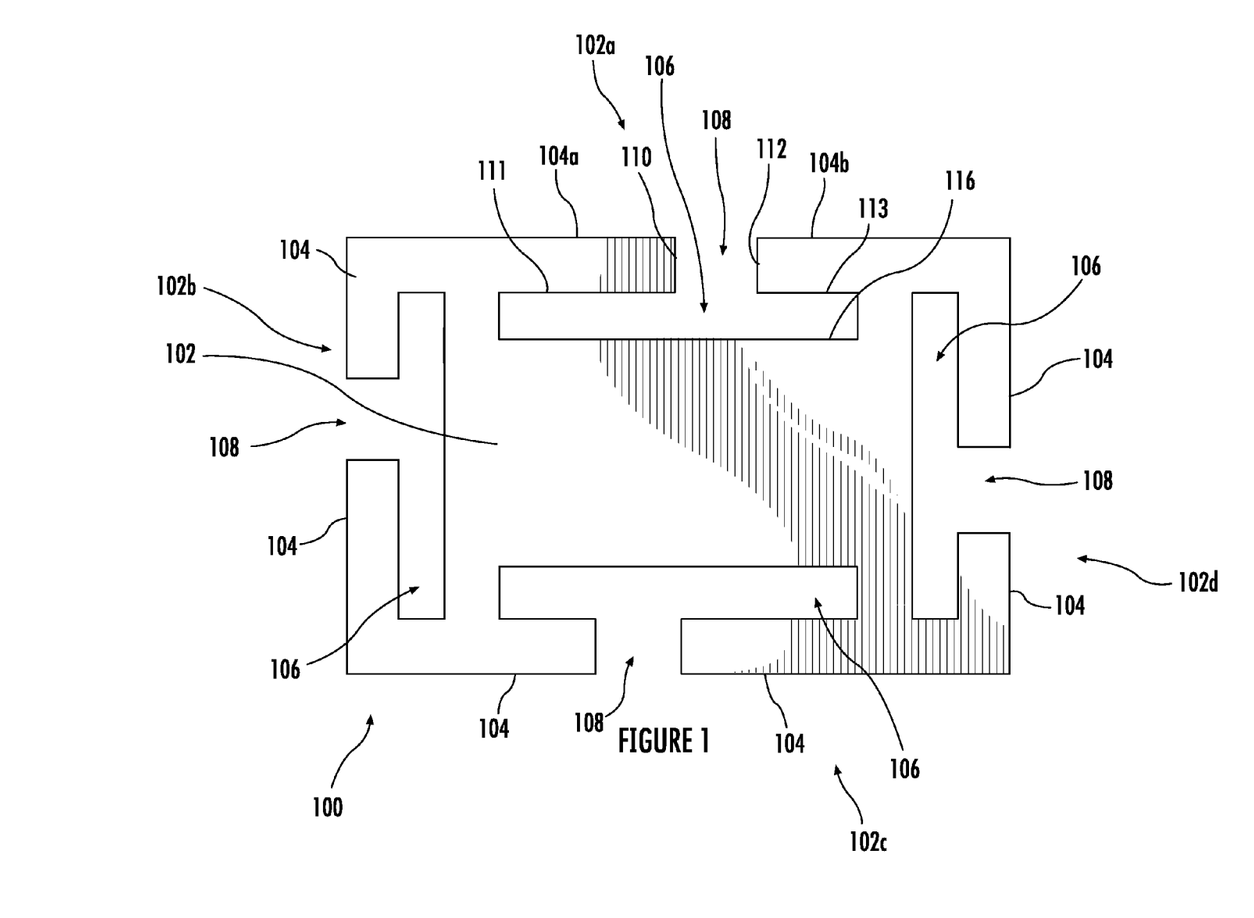
FIG. 1 is a top view of a connector according to certain embodiments of the present invention.
Figure 2:
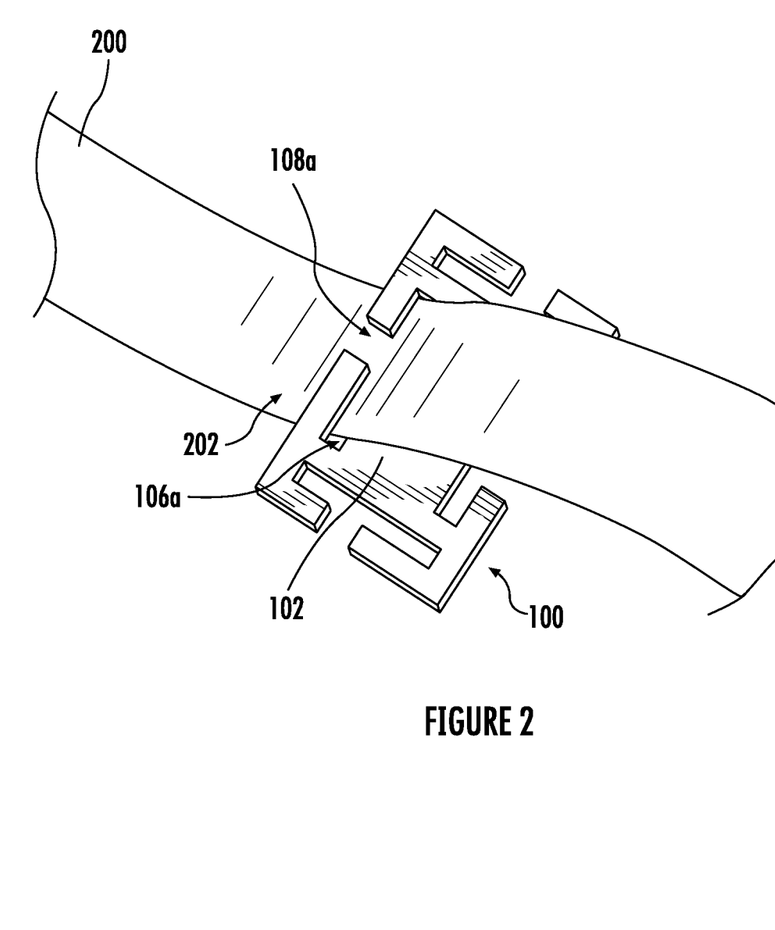
FIG. 2 is a perspective view of the connector of FIG. 1 in combination with a strap.
Figure 3:
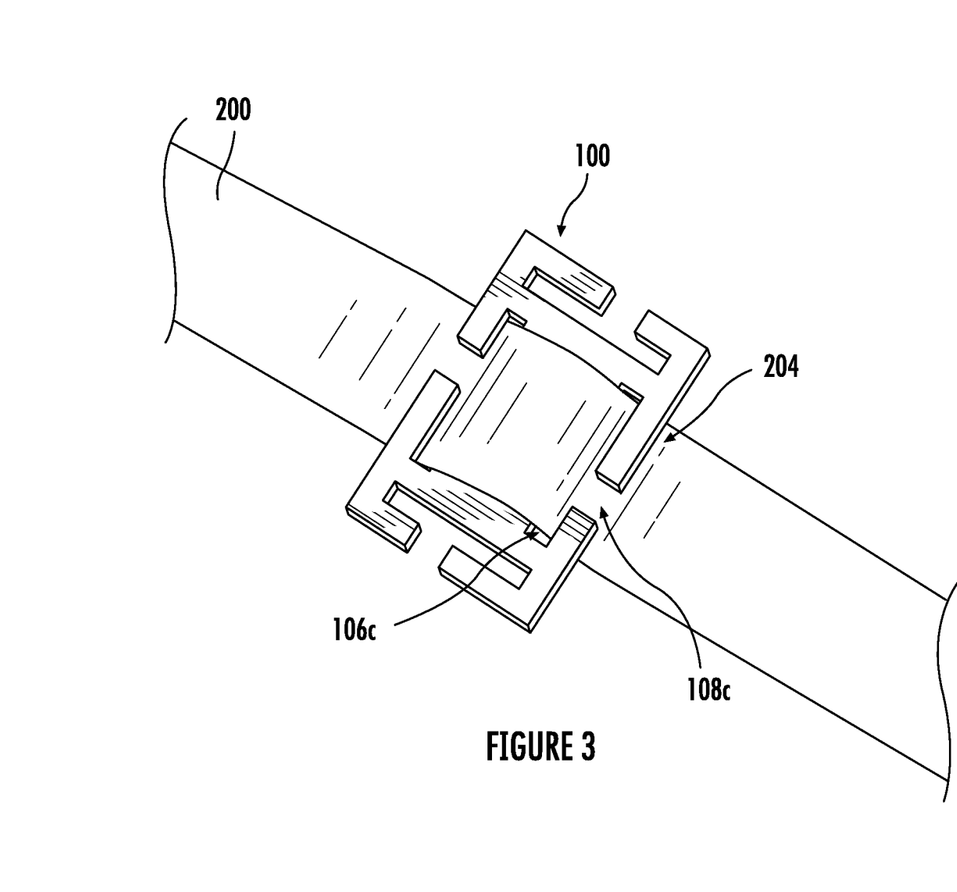
FIG. 3 is a perspective view of the connector of FIG. 1 in combination with a strap.
Figure 4:
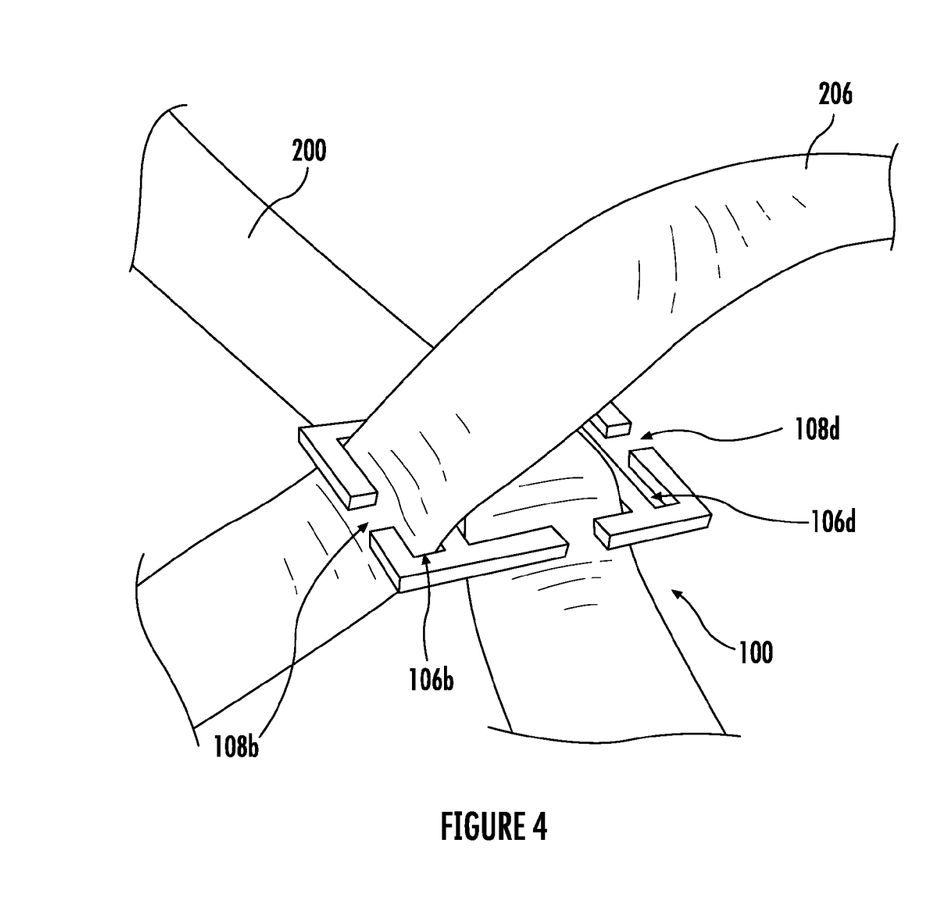
FIG. 4 is a perspective view of the connector of FIG. 1 in combination with two straps.
Figure 5:
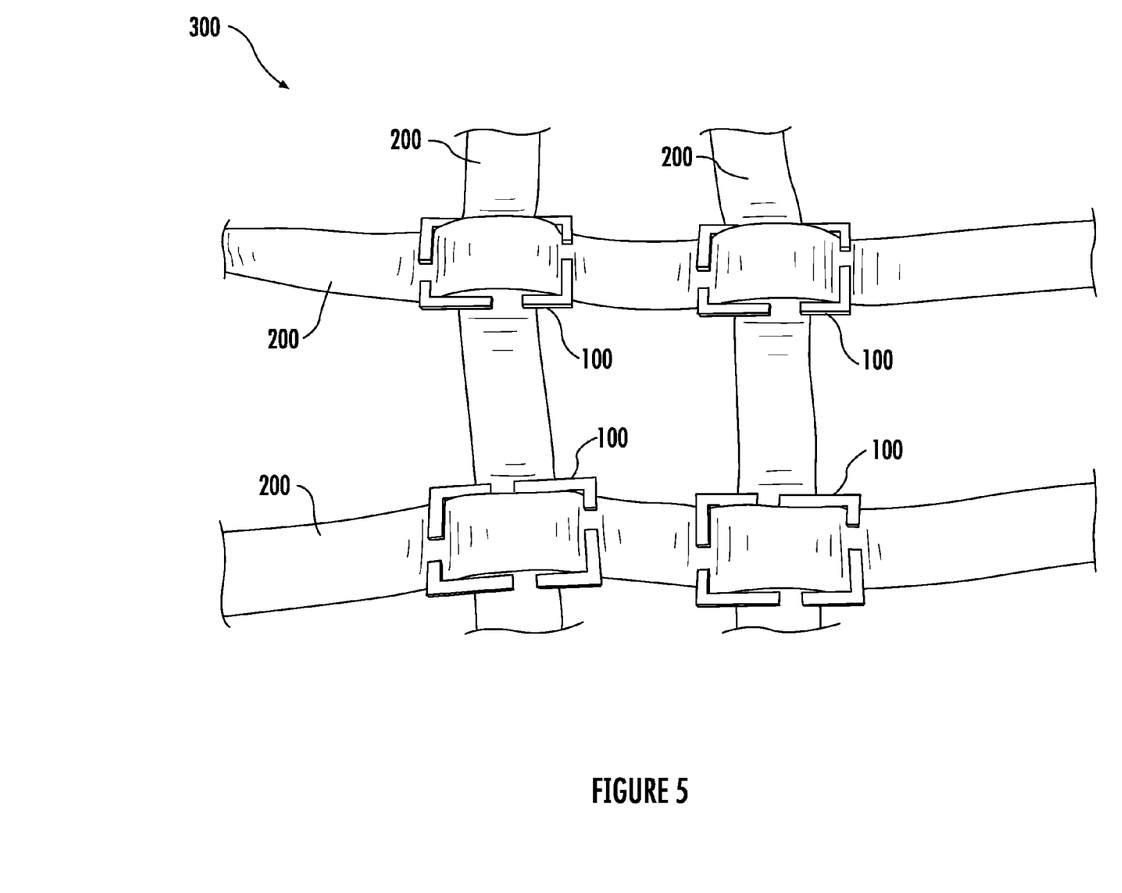
FIG. 5 is a perspective view of multiple connectors according to certain embodiments of the present invention in combination with four straps.

In use, two or more straps 200 may be coupled to the connector 100 to create a net-like strap system 300. For example, as illustrated in FIGS. 2-3, a first strap 200 may be coupled to the connector 100 via a first pair of opposing slots 106. A first portion 202 of the strap 200 may be inserted through a first slot 106a of the connector 100 via opening 108a, as illustrated in FIG. 2. A length of the strap 200 may then extend across the body 102 of the connector 100, as illustrated in FIG. 2. A downstream second portion 204 of the strap 200 may then be inserted into a second, opposing slot 106c of the connector 100 via opening 108c. The strap 200 is now coupled to the connector 100, as illustrated in FIG. 3. As illustrated in FIG. 4, a second strap 206 may subsequently be coupled to the connector 100 in similar fashion via a second pair of opposing slots 106b and 106d and respective openings 108b and 108d. In those embodiments comprising a third pair of opposing slots 106, a third strap (not pictured) may subsequently be coupled to the connector 100 in similar fashion, and so on. These steps may be repeated with additional connectors 100 and straps 200. The result is a net-like system 300 of connectors 100 and straps 200, as illustrated by example in FIG. 5, which may be visually similar to a cargo-net.

Unlike a cargo-net, however, prior to tensioning of the straps 200, one or more connectors 100 may be freely translated along the lengths of the straps 200 as desired to adjust the overall appearance and internal dimensions of the net-like system 300. For example, the connectors 100 illustrated in FIG. 5 may be translated along the lengths of the straps 200 toward one another to minimize the spacing between the straps 200 (i.e., develop a finer cargo net). Alternatively, the connectors 100 may be translated along the lengths of the straps 200 away from one another to enlarge the spacing between the straps 200. Relative tension may subsequently be applied to the straps 200 to encapsulate the net-like system 300 in the desired state and secure the desired load or cargo. During and after this tensioning, the strap 200 is tensioned around the body 102 of the connector 100 and underneath the arms 104 of the connector 100, in the slots 106, as illustrated in FIG. 3. In embodiments comprising offset openings 108, the offset in the openings 108 provides additional support against the tension forces acting upon the arms 104.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A connector comprising:
   (a) a body;
   (b) at least four arms extending from the body;
   (c) a first pair of opposing slots arranged substantially parallel to a first axis of the body, wherein each slot of the first pair of opposing slots is defined by two or more of the at least four arms and an edge of the body; and
   (d) a second pair of opposing slots arranged substantially parallel to a second axis of the body, wherein each slot of the second pair of opposing slots is defined by two or more of the at least four arms and an edge of the body;
   wherein, each slot of the first pair of opposing slots and each slot of the second pair of opposing slots comprises an opening defined by at least two of the at least four arms but is otherwise substantially closed so as to provide a defined lateral width of the slot; and
   wherein, the openings of the first pair of opposing slots are substantially proximate the second axis of the body but substantially offset from each other relative to the second axis of the body.

2. The connector of claim 1, wherein at least one of the at least four arms is integrally formed with another one of the at least four arms.

3. The connector of claim 1, wherein the at least four arms are integrally formed with the body.

4. The connector of claim 3, wherein the connector is formed of aluminum.

5. The connector of claim 1, wherein each slot of the first pair of opposing slots is substantially similar in shape and size to one another.

6. The connector of claim 5, wherein each slot of the second pair of opposing slots is substantially similar in shape and size to one another.

7. The connector of claim 1, wherein the openings of the second pair of opposing slots are substantially proximate the first axis of the body but substantially offset from each other relative to the first axis of the body.

8. A method of coupling a first strap with a second strap via a connector, the connector comprising (a) a body; (b) at least four arms extending from the body; and (c) a first pair of opposing slots arranged substantially parallel to a first axis of the body, wherein each slot of the first pair of opposing slots is defined by two or more of the at least four arms and an edge of the body; and (d) a second pair of opposing slots arranged substantially parallel to a second axis of the body, wherein each slot of the second pair of opposing slots is defined by two or more of the at least four arms and an edge of the body, wherein, each slot of the first pair of opposing slots and each slot of the second pair of opposing slots comprises an opening defined by at least two of the at least four arms but is otherwise substantially closed so as to provide a defined lateral width of the slot; and wherein, the openings of the first pair of opposing slots are substantially proximate the second axis of the body but substantially offset from each other relative to the second axis of the body, the method steps comprising:
   (i) inserting a first portion of the first strap into a first slot of the first pair of opposing slots via the opening of the first slot;
   (ii) inserting a second portion of the first strap into a second slot of the first pair of opposing slots via the opening of the second slot, and across the body of the connector;

(iii) inserting a first portion of the second strap into a first slot of the second pair of opposing slots via the opening of the first slot; and (iv) inserting a second portion of the second strap into a second slot of the second pair of opposing slots via the opening of the second slot, and across the body of the connector.

9. The method of claim 8, the method steps further comprising:

(v) translating the connector along a length of either the first strap or the second strap.

10. The method of claim 8, the method steps further comprising:

(v) tensioning either the first strap or the second strap.

11. The method of claim 8, wherein the at least four arms are integrally formed with the body.

12. The method of claim 11, wherein the connector is formed of aluminum.

13. The method of claim 8, wherein the openings of the second pair of opposing slots are substantially proximate the first axis of the body but substantially offset from each other relative to the first axis of the body.

14. A net-like system of straps comprising:

(a) a first strap;

(b) at least a second strap; and (c) at least one connector, wherein each connector comprises (1) a body; (2) at least four arms extending from the body; (3) a first pair of opposing slots arranged substantially parallel to a first axis of the body, wherein each slot of the first pair of opposing slots is defined by two or more of the at least four arms and an edge of the body; and (4) a second pair of opposing slots arranged substantially parallel to a second axis of the body, wherein each slot of the second pair of opposing slots is defined by two or more of the at least four arms and an edge of the body;

wherein, each slot of the first pair of opposing slots and each slot of the second pair of opposing slots comprises an opening defined by at least two of the at least four arms but is otherwise substantially closed so as to provide a defined lateral width of the slot, wherein, the openings of the first pair of opposing slots are substantially proximate the second axis of the body but substantially offset from each other relative to the second axis of the body;

wherein, the first strap is coupled to the at least one connector via the first pair of opposing slots; and wherein, the at least one second strap is coupled to the at least one connector via the second pair of opposing slots.

15. The net-like system of straps of claim 14, wherein the at least four arms are integrally formed with the body.

16. The net-like system of straps of claim 15, wherein the connector is formed of aluminum.

17. The net-like system of straps of claim 14, wherein the openings of the second pair of opposing slots are substantially proximate the first axis of the body but substantially offset from each other relative to the first axis of the body.

* * * * *